(12) United States Patent  
David

(10) Patent No.: US 11,815,694 B2  
(45) Date of Patent: Nov. 14, 2023

(54) AR CONTENT DISPLAY FOR REAR PASSENGERS USING INFRARED LIGHT

(71) Applicant: Toyota Motor Engineering & Manufacturing North America, Inc., Plano, TX (US)

(72) Inventor: Mikio David, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 168 days.

(21) Appl. No.: 17/375,467

(22) Filed: Jul. 14, 2021

(65) Prior Publication Data

US 2023/0014875 A1  Jan. 19, 2023

(51) Int. Cl.
| | |
|---|---|
| *G09G 5/00* | (2006.01) |
| *G02B 27/01* | (2006.01) |
| *B60R 1/08* | (2006.01) |
| *G02B 27/09* | (2006.01) |

(52) U.S. Cl.
CPC ............ *G02B 27/0179* (2013.01); *B60R 1/08* (2013.01); *G02B 27/0922* (2013.01); *B60K 2370/31* (2019.05); *G02B 2027/0196* (2013.01)

(58) Field of Classification Search
CPC ............ G02B 27/0179; G02B 27/0922; G02B 2027/0196; B60R 1/08; B60K 2370/31
USPC ............................................................. 345/7
See application file for complete search history.

(56) References Cited

U.S. PATENT DOCUMENTS

| | | | |
|---|---|---|---|
| 10,591,738 B2 | 3/2020 | Svarichevsky et al. | |
| 2007/0285810 A1 | 12/2007 | Brynielsson | |
| 2008/0068284 A1 | 3/2008 | Watanabe et al. | |
| 2009/0174238 A1 | 7/2009 | Kuno | |
| 2017/0270367 A1* | 9/2017 | He | B60R 1/00 |
| 2018/0147988 A1 | 5/2018 | Lee et al. | |
| 2018/0196259 A1* | 7/2018 | Chen | G02B 5/02 |
| 2020/0017122 A1 | 1/2020 | Chatten et al. | |
| 2020/0041997 A1 | 2/2020 | Tuukkanen et al. | |
| 2020/0156662 A1* | 5/2020 | Mimura | B60W 50/16 |
| 2020/0164897 A1 | 5/2020 | Krome et al. | |
| 2020/0172122 A1* | 6/2020 | Mimura | B60K 35/00 |
| 2020/0172123 A1* | 6/2020 | Kubota | B60W 50/14 |
| 2021/0021957 A1 | 1/2021 | Beaurepaire et al. | |

(Continued)

FOREIGN PATENT DOCUMENTS

| | | | |
|---|---|---|---|
| DE | 202005019292 U1 | 2/2006 | |
| GB | 2534151 A * | 7/2016 | B60K 35/00 |
| JP | 2002234401 A | 8/2002 | |

OTHER PUBLICATIONS

S. Wang et al., "Augmented Reality Prototype HUD for Passenger Infotainment in a Vehicular Environment", Jun. 2017, 9 pages, https://www.researchgate.net/publication/317606730_Augmented_Reality_Prototype_HUD_for_Passenger_Infotainment_in_a_Vehicular_Environment.

(Continued)

*Primary Examiner* — Thuy N Pardo

(74) *Attorney, Agent, or Firm* — DINSMORE & SHOHL LLP

(57) ABSTRACT

An apparatus may include a first emitter and a second emitter. The first emitter may be configured to emit visible light comprising first heads up display information to be displayed to a driver of a vehicle. The second emitter may be configured to emit infrared light comprising second heads up display information to be displayed to one or more rear seat passengers of the vehicle.

20 Claims, 6 Drawing Sheets

(56) References Cited

U.S. PATENT DOCUMENTS

| | | | | |
|---|---|---|---|---|
| 2021/0129755 | A1* | 5/2021 | Imamura | G02B 5/10 |
| 2021/0146943 | A1* | 5/2021 | Oniwa | B60R 21/00 |
| 2021/0146962 | A1* | 5/2021 | Kaji | B60W 30/17 |
| 2021/0188162 | A1* | 6/2021 | Yoshizawa | B60W 50/16 |
| 2021/0291658 | A1* | 9/2021 | Hirata | B60K 35/00 |
| 2022/0283635 | A1* | 9/2022 | Yuan | G02B 27/0093 |

OTHER PUBLICATIONS

"Opportunities in Autonomous Vehicle Interiors", 16 pages, Oct. 22, 2020, https://www.futurebridge.com/industry/perspectives-mobility/opportunitiesin-autonomous-vehicle-interiors/.

* cited by examiner

AR CONTENT DISPLAY FOR REAR PASSENGERS USING INFRARED LIGHT

TECHNICAL FIELD

The present specification generally relates to heads up displays for vehicles and, more specifically, to an AR content display for rear passengers using infrared light.

BACKGROUND

A heads up display in a vehicle allows a driver of the vehicle to view augmented reality (AR) or other information while looking through the windshield. As such, the driver is able to view AR information without taking his or her eyes off the road. The information displayed to the driver may include navigation information, vehicle data, or other types of information.

It may also be desirable to display AR content in a heads up display that can be viewed by rear vehicle passengers. A heads up display (HUD) may display similar information to rear seat passengers as is displayed to the driver (e.g., navigation information or vehicle data). However, it may also be desirable to display additional or different information to rear seat passengers that would not typically be displayed to a driver. For example, interactive AR content such as games may be presented to rear passengers in a HUD. Interactive content is typically not presented to a driver in order to avoid distracting the driver while driving the vehicle. Yet, rear seat passengers may be presented interactive or other types of content without this concern.

However, it may not be desirable to present AR content to rear seat passengers that can also be viewed by the driver as the driver may be distracted by the AR content intended for rear seat passengers. Accordingly, a need exists for a system to present AR content to rear seat passengers.

SUMMARY

In one embodiment, an apparatus may include a first emitter and a second emitter. The first emitter may emit visible light comprising first heads up display information to be displayed to a driver of a vehicle. The second emitter may emit infrared light comprising second heads up display information to be displayed to one or more rear seat passengers of the vehicle.

In another embodiment, a system for a vehicle may include a heads up display device and a screen positioned in front of rear seats of the vehicle. The heads up display may include a first emitter and a second emitter. The first emitter may emit visible light comprising first heads up display information onto a windshield of the vehicle. The second emitter may emit infrared light comprising second heads up display information onto the screen.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Disclosed herein is a system to present AR content to rear passengers using infrared light. A HUD may be used to present AR content to a driver of an automobile or other vehicle. As a driver drives a vehicle, a HUD may display AR content that the driver may view through the vehicle windshield. Accordingly, the driver may view the AR content displayed by the HUD without taking their eyes off the road.

Figure 1:
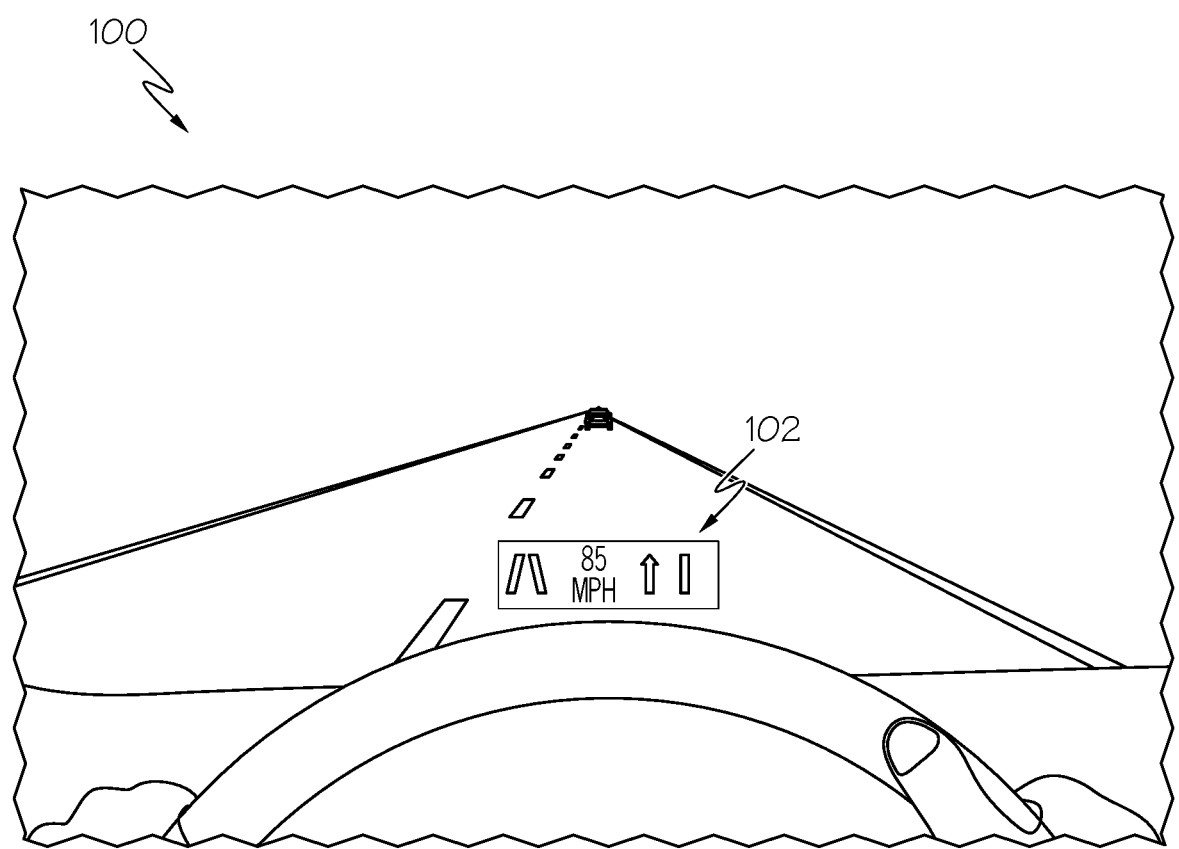
FIG. 1 shows a prior art image of an example heads up display for a vehicle.

FIG. 1 shows an example scene 100 that a driver may view through a vehicle windshield while driving a vehicle and using a HUD. In the example of FIG. 1, a HUD 102 is projected onto the windshield of a vehicle. In the example of FIG. 1, the HUD 102 shows the vehicle speed and information about the upcoming road. However, in other examples, the HUD 102 may display navigation information, other vehicle information (e.g., gas mileage), or other types of information or data. Because the HUD 102 is projected onto the windshield of the vehicle, the driver may view the HUD 102 while also viewing the road and therefore, without impairing the driver's driving performance.

It may be desirable to provide a similar type of heads up display that passengers riding in the rear seats of a vehicle may view. Because the HUD for the driver is projected onto the windshield in front of the driver, it may be difficult or impossible for rear seat passengers to view the HUD. Furthermore, it may be desirable to display different or additional information to rear seat passengers than what is displayed to the driver. For example, rear seat passengers may be shown a HUD that displays interactive content that the rear seat passengers may interact with through in-vehicle components or mobile devices. Accordingly, disclosed herein is a system for providing a HUD to rear seat passengers.

Figure 2:
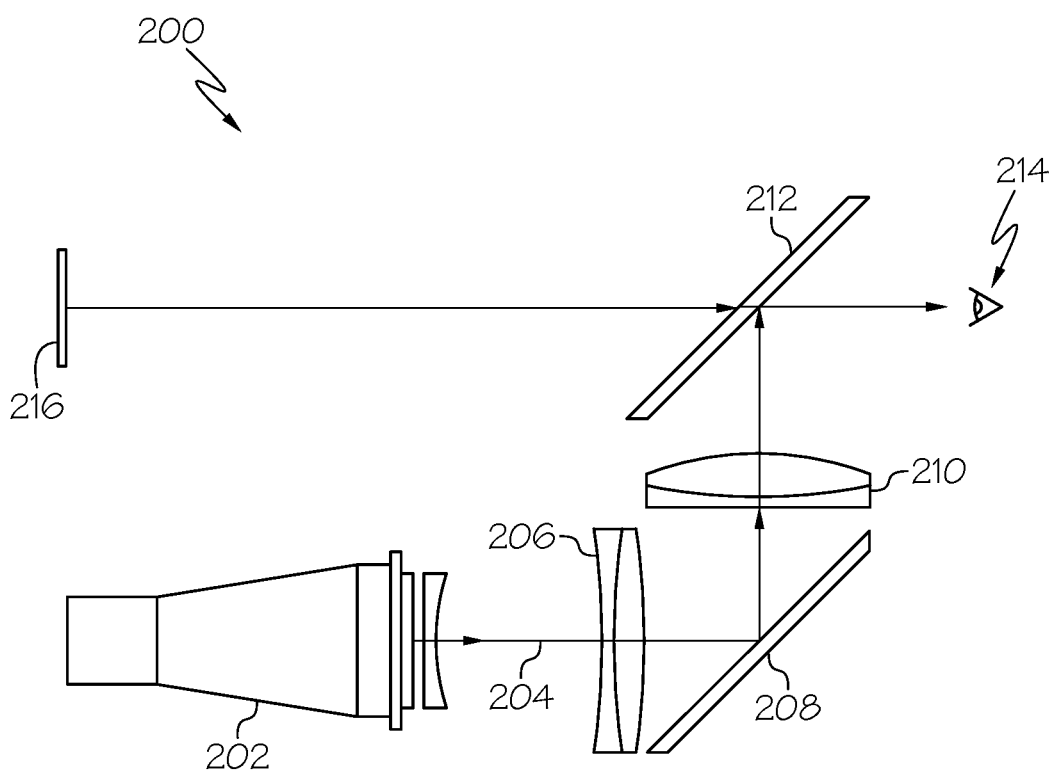
FIG. 2 shows a schematic diagram of a prior heads up display device.

FIG. 2 shows a typical HUD system 200 for providing a HUD to a vehicle driver. In some examples, the HUD system 200 may be located in a box near the dashboard of a vehicle. However, in other examples, the HUD system 200 may be located at another position in the vehicle.

In the example of FIG. 2, a light source or emitter 202 emits light 204 in a pattern including the information to be projected onto the windshield. In some embodiments, the light source 202 comprises a laser. In other examples, the light source 202 may comprise a cathode ray tube or another type of light source able to emit the light to be projected onto the windshield.

After the light source 202 emits the light 204, the light 204 may pass through a lens 206 to focus and/or collimate the light 204. A mirror 208 may then reflect the light 204 towards the windshield 212 of the vehicle. The mirror 208 may be angled to ensure that the light 204 is reflected onto the windshield 212 at the proper angle and location. In some examples, multiple mirrors may be used to direct the light 204 emitted by the light source 202 towards the windshield 212. After being reflected off of the mirror 208, the light 204 may then pass through another lens 210 to focus and/or collimate the light, which then reaches the windshield 212.

When the light 204 hits the windshield 212, the windshield 212 may reflect the light 204 towards the driver 214 such that the driver 214 can view the reflected light 204. Because of the way the light is reflected, it appears to the driver that the light 204 originated from a location 216 in front of the windshield 212. Accordingly, the HUD display may appear to the driver 214 in the manner shown in FIG. 1.

In some examples, the light 204 may reflect off an inner surface and an outer surface of the windshield 212. Thus, because of the thickness of the windshield 212, these two reflections may result in two slightly offset images as viewed by the driver 214. One of these images may be referred to as a ghost image. As such, without appropriate correction, the driver 214 may view the undesirable ghost image of the HUD. Accordingly, the windshield 212 may include a film to filter out one of these images and eliminate the ghost image.

As discussed above, it may be desirable for a vehicle to include another HUD system that may be viewed by rear passengers. However, if this other HUD system were to project visible light, in a similar manner as the driver's HUD system, the driver may view this other HUD and become distracted. Accordingly, it may be desirable for this other HUD to only be viewable by the rear seat passengers and not by the driver. As such, this other HUD system may utilize infrared (IR) light, as disclosed herein.

Figure 3:
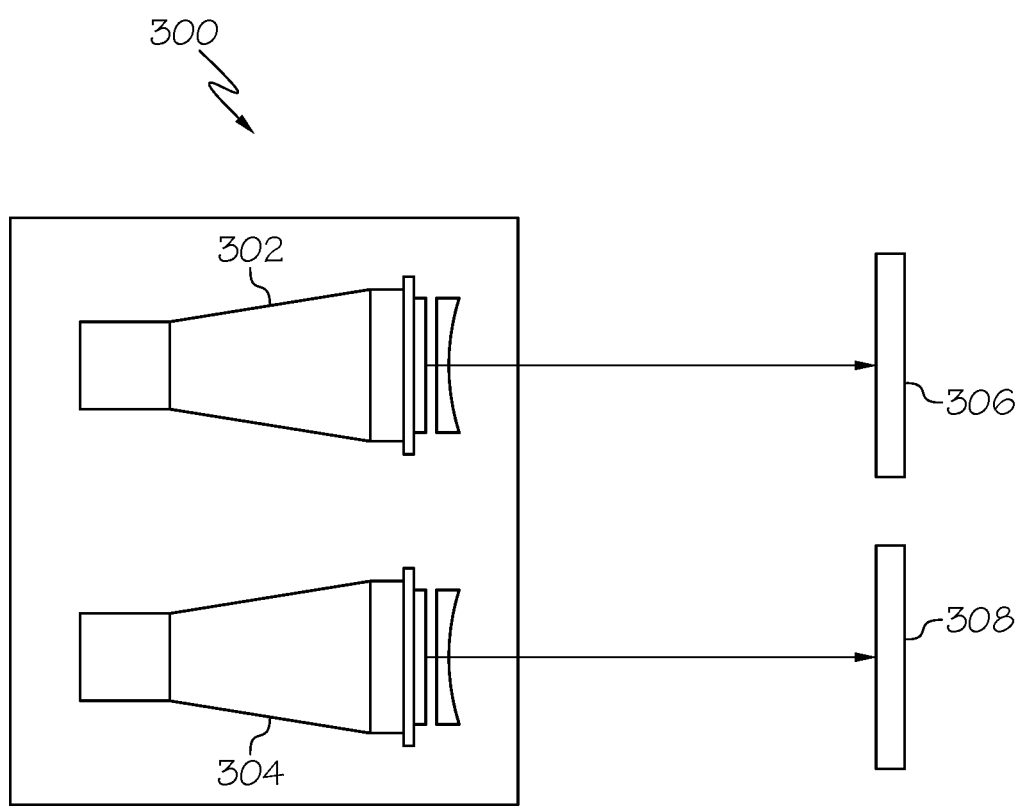
FIG. 3 shows a schematic diagram of an example heads up display device according to one or more embodiments shown and described herein.

FIG. 3 shows a HUD device 300 for generating multiple HUDs. The HUD device 300 may generate a first HUD for a driver of a vehicle, which may be referred to herein as a driver HUD, and a second HUD for rear seat passengers of the vehicle, which may be referred to herein as a rear HUD.

As shown in FIG. 3, the HUD system 200 may include a first light source or emitter 302 and a second light source or emitter 304. The first emitter 302 may emit visible light comprising information to be displayed as the driver HUD and the second emitter 304 may emit infrared light comprising information to be displayed as the rear HUD. In particular, the emitter 302 may emit visible light comprising a pattern to be displayed as the driver HUD (e.g., navigation information). The pattern emitted by the emitter 302 may change over time as the information to be presented to the driver changes. Similarly, the emitter 304 may emit infrared light comprising a pattern to be displayed as the rear passenger HUD (e.g., interactive information). The pattern emitted by the emitter 304 may change over time as the information to be presented to the rear passengers changes. An electronic control unit may control the outputs of the first emitter 302 and the second emitter 304 based on sensor data, navigation data, or other data. In some examples, a user may adjust the type of information to be displayed in the driver HUD and/or the rear HUD.

In the example of FIG. 3, the first emitter 302 and the second emitter 304 are contained in a single apparatus (e.g., a box positioned near the dashboard of the vehicle). As such, a single device may generate both the driver HUD and the rear passenger HUD. However, in other examples, the first emitter 302 and the second emitter 304 may each be contained in different apparatuses which may be located at different positions in a vehicle.

In the example of FIG. 3, the HUD device 300 may comprise a first set of mirrors 306 and a second set of mirrors 308. The first set of mirrors 306 may project the visible light emitted by the first emitter 302 towards the windshield of a vehicle. The second set of mirrors 308 may project the infrared light emitted by the second emitter 304 towards a screen in front of rear seat passengers. The screen onto which the infrared light may be projected is discussed in further detail below.

The first set of mirrors 306 may be positioned and/or angled to reflect the light emitted by the first emitter 302 towards the vehicle windshield. In one example, the first set of mirrors 306 may comprise a single mirror similar to the mirror 208 of FIG. 2. As such, when the light emitted by the first emitter 302 strikes the mirror 306, the light may be reflected off the mirror 306 and projected onto the windshield of the vehicle. In other examples, the first set of mirrors 306 may comprise a plurality of mirrors to direct the light emitted by the first emitter 302 onto the vehicle windshield.

Similarly, the second set of mirrors 308 may be positioned and/or angled to reflect the light emitted by the second emitter 304 towards the rear passengers of the vehicle. In one example, the second set of mirrors 308 may comprise a single mirror. In other examples, the second set of mirrors 308 may contain a plurality of mirrors.

Figure 4:
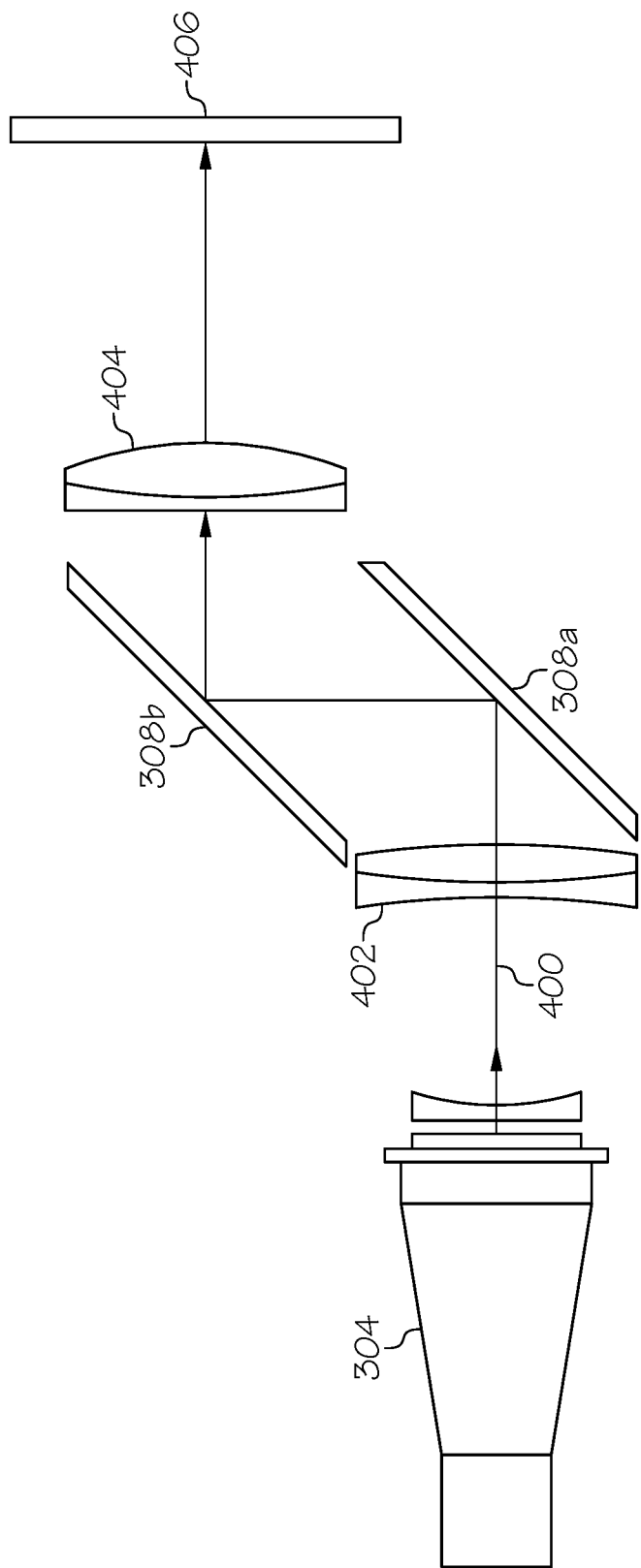
FIG. 4 shows a schematic diagram of a portion of the heads up display device of FIG. 3 according to one or more embodiments shown and described herein.

For example, FIG. 4 shows a portion of the HUD device 300 comprising the second emitter 304 and the second set of mirrors 308. In the example of FIG. 4, the second set of mirrors 308 comprises mirrors 308a and 308b. In the example of FIG. 4, the second emitter 304 may emit IR light 400. The IR light 400 may pass through a lens 402 and may be reflected off of the mirror 308a. The IR light 400 may then be directed towards the mirror 308b and may be reflected off the mirror 308b towards the lens 404. The IR light 400 may pass through the lens 404 and may arrive at a plane 406 positioned in front of the rear seats of the vehicle. The plane 406 may comprise a screen to display the rear HUD, as discussed in further detail below.

Figure 5:
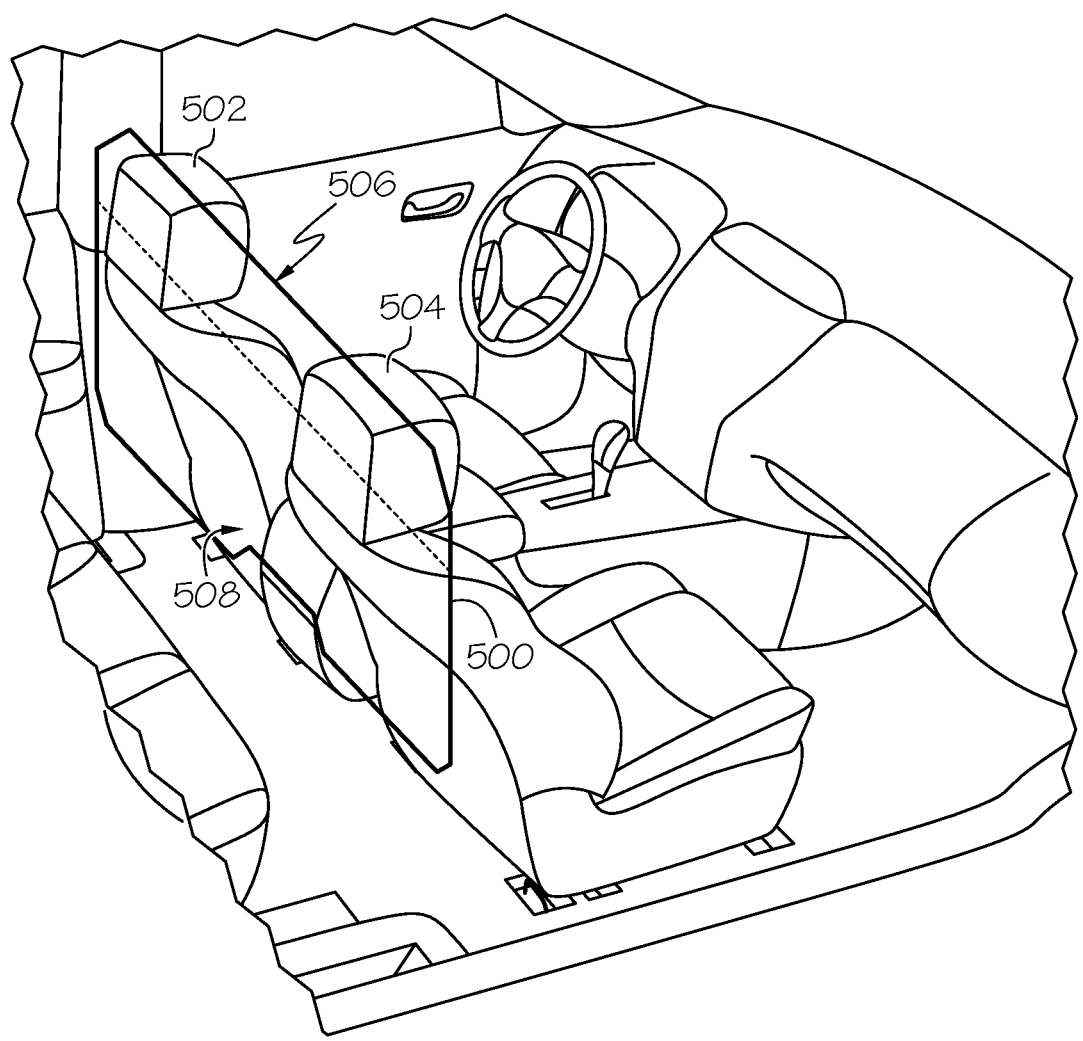
FIG. 5 shows an example rear heads up display screen according to one or more embodiments shown and described herein.

FIG. 5 shows an example screen onto which the rear HUD may be projected. In the example of FIG. 5, a screen 500 may be positioned between front seats 502 and 504 of a vehicle. In some examples, the screen 500 may be affixed to the front seats 502, 504. In other examples, the screen 500 may be part of a divider between the front seats 502, 504. In other examples, the screen 500 may be otherwise positioned or affixed such that it is positioned in front of the rear seats of the vehicle such that it can be viewed by passengers sitting in the rear seats of the vehicle. In embodiments, the screen 500 may be made of glass or plastic or any other type of material upon which light may be projected and viewed by rear seat passengers. In some examples, the screen 500 may be removable. In other examples, the screen 500 may be permanently affixed to or built into the vehicle.

As discussed above, when the second emitter 304 emits IR light, the second set of mirrors 308 may cause the IR light to be projected onto the screen 500. Because the light emitted by the second emitter 304 is infrared, the light is not directly visible to the human eye. As such, as the IR light is projected from the dashboard or other location of the HUD device 300, it is not visible to the vehicle driver. Thus, the driver may not be distracted by the projection of the light towards the rear seat.

Once the IR light emitted by the second emitter 304 hits the screen 500, it may be viewed by rear seat passengers. However, because the light is infrared, a filter or other mechanism may be used on the screen 500 such that the infrared light may be made visible to the human eye. A variety of mechanisms may be used to cause the infrared light to be visible to the human eye. In one example, a filter on the screen 500 may comprise two color shifted pieces of plastic (e.g., red and blue) that overlap each other and allow infrared light to be visible. In other examples, other types of filters on the screen 500 may be used such that the IR light projected onto the screen 500 is visible to rear passengers of the vehicle.

Once the IR light emitted by the second emitter 304 is projected onto the screen 500, the filter on the screen 500 may cause the IR light to be visible to the human eye. As such, any passengers in the rear seat of the vehicle may be able to view the IR light as a rear seat HUD.

While the driver of the vehicle may not be distracted by the light being emitted from the HUD device 300 to the screen 500 since it is IR light, once the IR light is projected onto the screen 500, the projected image is visible to the human eye because of the filter on the screen 500. As such, if the driver of the vehicle were to look back at the screen, either directly or through the vehicle's rear-view mirror, the driver may be distracted by the rear seat HUD if the projected image were in the driver's line of sight. Accordingly, in some examples, the screen 500 may be divided into an upper portion 506 and a lower portion 508. The upper portion 506 of the screen 500 may be used for the line of sight of the driver when using the rear-view mirror and the lower portion 508 of the screen 500 may be used for the rear HUD.

In embodiments, the IR light from the second emitter 304 may be projected onto the lower portion 508 of the screen and not onto the upper portion 506. In one example, this may be accomplished by angling the second set of mirrors 308 to direct the IR light to the appropriate location on the screen 500. The upper portion 506 of the screen 500 may provide a region for a clear line of sight of the driver when looking through the rear-view mirror. As such, when the driver of the vehicle looks through the vehicle's rear view mirror, the driver can look through the upper portion 506 of the screen 500 without being distracted by the HUD images on the lower portion 508 of the screen 500. At the same time, passengers in the rear seat of the vehicle can view the HUD images on the lower portion 508 of the screen 500.

Figure 6:
FIG. 6 shows an interior view of an example vehicle using the heads up display device of FIGS. 3-4 according to one or more embodiments shown and described herein.

Turning now to FIG. 6, a perspective view of a vehicle interior utilizing the HUD device 300 is shown. In the example of FIG. 6, the HUD device 300 is positioned near the vehicle dashboard. The first emitter 302 may project visible light 204 containing images of the driver HUD onto the vehicle windshield and the second emitter 304 may project IR light 400 containing images of the rear HUD towards the screen 500 in front of the rear seats of the vehicle. As such the driver of the vehicle may view the driver HUD through the windshield and the rear seat passengers of the vehicle may view the rear HUD through the screen 500.

In some examples, two different HUD devices may be used to project the driver HUD and the rear HUD. For example, a first HUD device may be positioned near the dashboard of the vehicle and may project visible light comprising the driver HUD onto the windshield. A second HUD device may be positioned in another location in the vehicle and may project infrared light comprising the rear HUD onto the screen 500. For example, the second HUD device may be positioned at another location along the dashboard separated from the first HUD device. Alternatively, the second HUD device may be positioned behind the vehicle rear seats and may project the IR light from behind the rear seats towards the screen 500.

In the illustrated example, the HUD device 300 projects visible light comprising the driver HUD onto the windshield and IR light comprising the rear HUD onto the screen 500. However, in another example, a second HUD may be projected onto a portion of the windshield in front of the front passenger seat of the vehicle. In this example, a front seat passenger of the vehicle may view a separate HUD from the driver.

In this example, the mirrors 308 of the HUD device 300 may direct the IR light emitted by the second emitter 304 towards a portion of the windshield in front of the front passenger seat. That portion of the windshield may have a filter that allows the IR light emitted by the second emitter 304 to be visible to the human eye. As such, in this example, the driver of the vehicle may view a first HUD positioned along the portion of the windshield in front of the driver and a front passenger of the vehicle may view a second HUD positioned along the portion of the windshield in front of the front passenger. Each HUD may display different information. For example, the passenger HUD may display interactive content that may be interacted with by the passenger, since the passenger is not driving the vehicle.

In examples where either the rear HUD or the passenger HUD display interactive content, the HUD device 300 may include a transceiver to send and receive information to and from a mobile device of a user (e.g., a smartphone). In one example, Bluetooth communication protocol may be used to establish communication between the HUD device and a user's mobile device. The HUD device 300 may further comprise an electronic control unit (ECU) that generates content to be displayed by the rear HUD or the passenger HUD based on data received by the transceiver. For example, rear seat passengers of a vehicle may use smartphones to play an interactive game that is displayed with the rear HUD. The transceiver of the HUD device 300 may receive commands or game controls from a user's mobile device and the ECU of the HUD device 300 may update the game state based on the received commands and generate new images to be displayed by the rear HUD accordingly. In other examples, an in-vehicle device such as a built-in keyboard located in the vehicle may be used to receive interactive commands from users rather than a mobile device.

It should now be understood that embodiments disclosed herein describe an AR content display for rear passengers using infrared light. A HUD device may comprise two emitters; one emitter that generates visible light comprising a driver HUD and another emitter that generates infrared light comprising a rear HUD. A first set of mirrors may cause the visible light emitted by the first emitter onto the windshield of the vehicle in front of the driver and a second set of mirrors may cause the infrared light emitted by the second emitter onto a screen positioned in front of rear vehicle passengers.

The screen positioned in front of the rear vehicle passengers may have a filter that causes infrared light to be visible to the human eye such that the rear HUD can be viewed by rear seat passengers. The infrared light emitted by the second emitter may be projected onto a lower portion of the screen such that a clear line of sight exists on the upper portion of the screen that may allow the driver to see behind the vehicle using the rear-view mirror without the view being obstructed by the rear HUD.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. It is noted that the terms "upper" and "lower" are utilized herein for convenience of illustration but these terms do not mean an intended direction.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An apparatus comprising:
a first emitter configured to emit visible light comprising first heads up display information to be displayed to a driver of a vehicle; and
a second emitter configured to emit infrared light comprising second heads up display information to be displayed to one or more rear seat passengers of the vehicle.

2. The apparatus of claim 1, wherein the first emitter is configured to project the visible light onto a windshield of the vehicle.

3. The apparatus of claim 2, further comprising one or more first mirrors to project the visible light from the first emitter onto the windshield.

4. The apparatus of claim 1, wherein the second emitter is configured to project the infrared light onto a screen positioned in front of the rear seats of the vehicle.

5. The apparatus of claim 4, further comprising one or more second mirrors to project the light from the second emitter onto the screen positioned in front of the rear seats of the vehicle.

6. The apparatus of claim 4, wherein the screen is positioned between the front seats of the vehicle.

7. The apparatus of claim 4, wherein the screen comprises a filter that allows the infrared light to be viewed by the one or more rear seat passengers.

8. The apparatus of claim 4, wherein the second emitter is configured to project the infrared light onto a portion of the screen below a line of sight of the driver using a rear view mirror of the vehicle.

9. The apparatus of claim 1, wherein the first emitter comprises a laser configured to emit visible light.

10. The apparatus of claim 1, wherein the second emitter comprises a laser configured to emit infrared light.

11. The apparatus of claim 1, wherein the first emitter and the second emitter each comprise a cathode ray tube.

12. A system for a vehicle comprising:
a heads up display device; and
a screen positioned in front of rear seats of the vehicle;
wherein the heads up display device comprises:
a first emitter configured to emit visible light comprising first heads up display information onto a windshield of the vehicle; and
a second emitter configured to emit infrared light comprising second heads up display information onto the screen.

13. The system of claim 12, wherein the first emitter is configured to project the visible light onto a portion of the windshield in front of a driver of the vehicle.

14. The system of claim 12, wherein the heads up display device further comprises one or more first mirrors to project the light from the first emitter onto the windshield.

15. The system of claim 12, wherein the heads up display device further comprises one or more second mirrors to project the light from the second emitter onto the screen.

16. The system of claim 12, wherein the screen is positioned between the front seats of the vehicle.

17. The system of claim 12, wherein the screen comprises a filter that allows the infrared light to be viewed by one or more rear seat passengers.

18. The system of claim 12, wherein the second emitter is configured to project the infrared light onto a portion of the screen below a line of sight of a driver using a rear view mirror of the vehicle.

19. The system of claim 12, wherein the first emitter comprises a laser configured to emit visible light.

20. The system of claim 12, wherein the second emitter comprises a laser configured to emit infrared light.

* * * * *